US010403327B2

United States Patent
Raphael et al.

(10) Patent No.: US 10,403,327 B2
(45) Date of Patent: Sep. 3, 2019

(54) CONTENT IDENTIFICATION AND PLAYBACK

(71) Applicant: Google LLC, Mountain View, CA (US)

(72) Inventors: Seth Raphael, Redwood City, CA (US); Hayes S. Raffle, Palo Alto, CA (US); Xavier Benavides Palos, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/905,733

(22) Filed: Feb. 26, 2018

(65) Prior Publication Data

US 2018/0247676 A1 Aug. 30, 2018

Related U.S. Application Data

(60) Provisional application No. 62/463,782, filed on Feb. 27, 2017.

(51) Int. Cl.
| | |
|---|---|
| *G11B 31/00* | (2006.01) |
| *G11B 27/11* | (2006.01) |
| *G11B 27/00* | (2006.01) |
| *H04N 21/442* | (2011.01) |
| *H04N 21/41* | (2011.01) |
| *H04N 21/472* | (2011.01) |
| *H04N 21/439* | (2011.01) |

(Continued)

(52) U.S. Cl.
CPC .......... *G11B 31/006* (2013.01); *G11B 27/007* (2013.01); *G11B 27/11* (2013.01); *H04N 21/4122* (2013.01); *H04N 21/4126* (2013.01); *H04N 21/4307* (2013.01); *H04N 21/4394* (2013.01); *H04N 21/43637* (2013.01); *H04N 21/44218* (2013.01); *H04N 21/47217* (2013.01); *H04N 21/4314* (2013.01); *H04N 21/6587* (2013.01)

(58) Field of Classification Search
USPC .......................................................... 386/353
See application file for complete search history.

(56) References Cited

U.S. PATENT DOCUMENTS

| 9,413,426 B2* | 8/2016 | Lee | |
| 2013/0147686 A1* | 6/2013 | Clavin | G06F 3/013 345/8 |

(Continued)

OTHER PUBLICATIONS

International Search Report and Written Opinion for International Application No. PCT/US2018/019879, dated Apr. 26, 2018, 16 pages.

*Primary Examiner* — William C Vaughn, Jr.
*Assistant Examiner* — Daniel T Tekle
(74) *Attorney, Agent, or Firm* — Brake Hughes Bellermann LLP

(57) ABSTRACT

Systems and methods for playing back content based on external content are provided. An example system and method may identify content based on an environment in which a content-playback device is located. The example system and method may also detect a playback-initiation action performed by a user of the content-playback device and identify a content-playback position based on the playback-initiation action. The example system and method may also trigger playback of the content on the content-playback device based on the identified content-playback position.

20 Claims, 8 Drawing Sheets

(51) Int. Cl.
H04N 21/43 (2011.01)
H04N 21/4363 (2011.01)
*H04N 21/431* (2011.01)
*H04N 21/6587* (2011.01)

(56) References Cited

U.S. PATENT DOCUMENTS

| | | |
|---|---|---|
| 2014/0028914 A1* | 1/2014 | Polak .................. H04N 5/04 348/515 |
| 2014/0198033 A1 | 7/2014 | Kobayashi |
| 2015/0086173 A1 | 3/2015 | Abecassis |

* cited by examiner

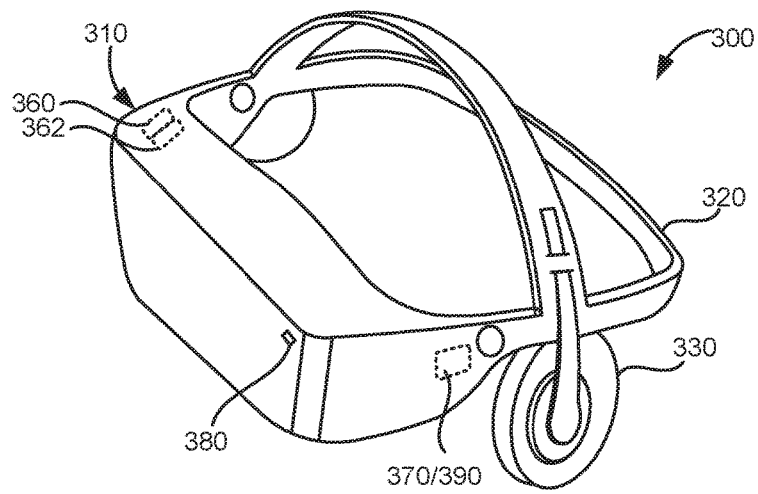
FIG. 3A
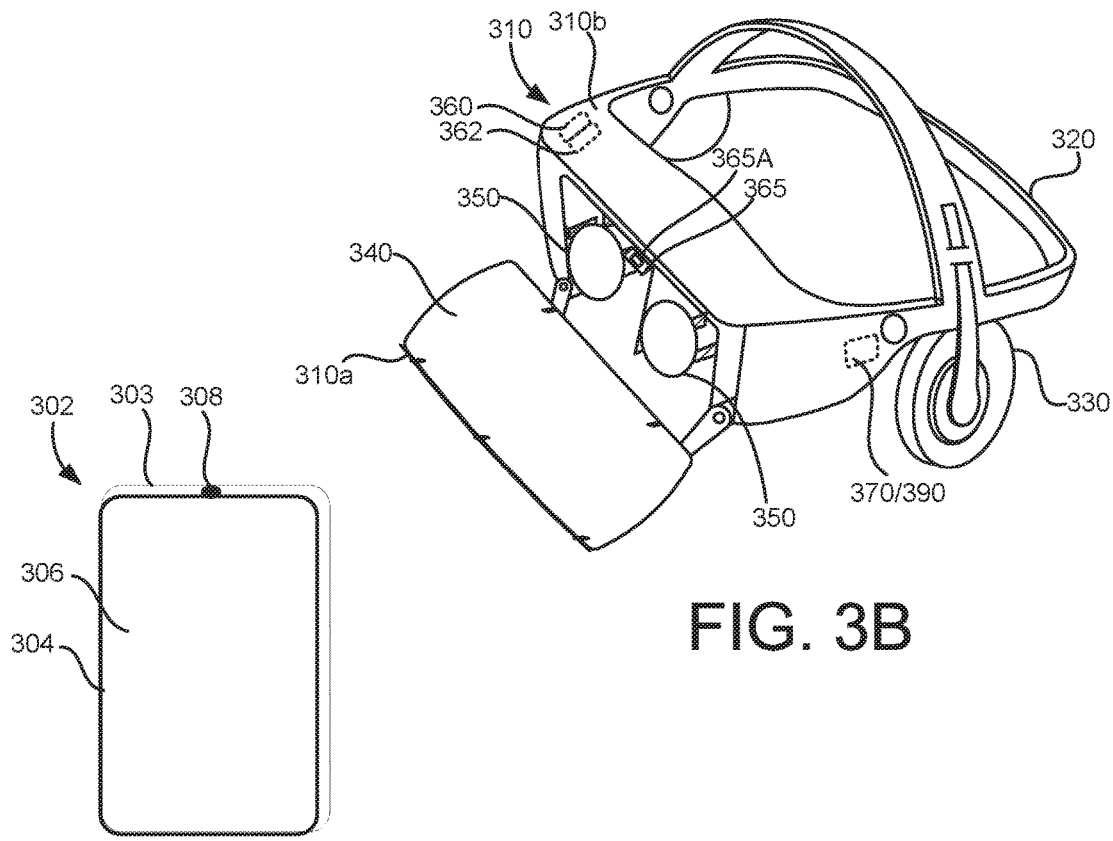
FIG. 3B
FIG. 3C

CONTENT IDENTIFICATION AND PLAYBACK

CROSS-REFERENCE TO RELATED APPLICATION

This application is a Nonprovisional of, and claims priority to, U.S. Patent Application No. 62/463,782, filed on Feb. 27, 2017, the disclosure of which is incorporated herein by reference in its entirety.

BACKGROUND

Watching sports and other forms of entertainment is a common activity. For example, people often watch sporting events on television. When watching a sporting event on television, a content stream is received (e.g., via an antenna, cable, satellite, or over the Internet) and displayed by the television. The content stream typically includes video content that has been recorded at the sporting event. Often, the content stream includes replays of portions of the sporting event that are selected by an editor or producer of the content stream.

SUMMARY

This document relates, generally, to identifying and playing back content based on the environment in which a content-playback device is located.

In one aspect, a method may include identifying content based on an environment in which a content-playback device is located, detecting a playback-initiation action performed by a user of the content-playback device, identifying a content-playback position based on the playback-initiation action, and triggering playback of the content on the content-playback device based on the identified content-playback position. This may enable relevant content to be presented to users in an efficient and timely manner.

In a further aspect, identifying content based on the environment in which the content-playback device is located includes identifying external content playing on an external display device that is separate from the content-playback device. This may facilitate effective and reliable identification of content, enabling the content to be provided quickly and efficiently.

In another aspect, identifying content based on the environment in which the content-playback device is located includes: recording an audio sample using a microphone of the content-playback device; generating an acoustic fingerprint based on the audio sample; and using the acoustic fingerprint to identify the external content playing on the external display device. Such acoustic fingerprinting may enable efficient identification and provision of content.

In one aspect, identifying content based on the environment in which the content-playback device is located includes: determining a location of the content-playback device; and identifying content that is currently available in the determined location. Utilizing location information in this way improves accuracy and speed of content identification.

In an aspect, identifying a content-playback position based on the playback-initiation action includes: determining a content-synchronization position for the identified content; and determining the content-playback position by offsetting the content-synchronization position by a replay time offset. This may facilitate improved synchronization, enabling content to be provided at appropriate times in an efficient and reliable manner. Device-mount events may be detected based on, for example, an orientation of and/or an ambient light sensed by a content-playback device, thereby addressing problems associated with determining whether content should or should not be displayed.

Another aspect includes detecting a device-unmount event and responsive to detecting the device-unmount event, terminating content playback on the content-playback device. Detection of a device being unmounted may enable content playback to be terminated, thereby saving power and hence preserving battery life.

In another aspect, a system may include a computing device configured to identify content based on an environment in which a content-playback device is located, detect a playback-initiation action performed by a user of the content-playback device, identify a content-playback position within the content based on the playback-initiation action, and trigger playback of the content within a content-playback session on the content-playback device based on the identified content-playback position. Advantageously, this system may enable automatic, efficient provision of content to users.

In another aspect, a computer program product embodied on a non-transitory computer readable medium may have stored thereon a sequence of instructions. When executed by a processor, the instructions may cause the processor to execute a method. The method may include identifying content based on an environment in which a content-playback device is located, detecting a playback-initiation action performed by a user of the content-playback device, identifying a content-playback position based on the playback-initiation action, and triggering playback of the content on the content-playback device based on the identified content-playback position.

In one aspect, a computing device includes at least one processor and memory storing instructions that, when executed by the at least one processor, cause the computing device to identify content based on an environment in which a content-playback device is located. The instructions may also cause the computing device to detect a playback-initiation action performed by a user of the content-playback device and initiate a content-playback session based on the playback-initiation action. The instructions may also cause the computing device to identify a content-playback position based on the playback-initiation action and playback content within the content-playback session on the content-playback device based on the identified content-playback position. Advantageously, these instructions may enable the computing device to provide content to users automatically.

In one aspect, a method may include identifying, by a head-mounted display device, a content stream associated with external content playing on an external display device, detecting, by the head-mounted display device, that the head-mounted display device has been mounted on a user's head, when detected that the head-mounted display device has been mounted on the user's head: identifying, by the head-mounted display device, a synchronization position in the content stream that corresponds to the external content, identifying a replay-playback position within the content stream that precedes the synchronization position, and triggering playback of the content stream based on the identified replay-playback position. This method may enable the provision of information that supplements external content via a head-mounted display, in an efficient and timely manner.

In some aspects, a user input may trigger playback of the content stream in slow motion, thereby improving user experience. Beneficially, false positives relating to such user inputs may be addressed by detecting that a button of the head-mounted display device is depressed for at least a predetermined duration of time. Content streams may include a replay content stream that is different than a video stream of the external content (e.g. video captured by a different camera than the video stream of the external content), further enhancing user experience.

In yet further aspects, the content stream may be identified by recording an audio sample of the external content playing on the external display device using a microphone of the content-playback device; generating an acoustic fingerprint based on the audio sample; using the acoustic fingerprint to identify the external content playing on the external display device; and identifying the content stream based on the identified external content. Optional further aspects include identifying a plurality of content streams associated with the external content, each of the content streams being associated with different cameras; and presenting a content selection user interface for receiving a selection input to identify a content stream from the plurality of content streams; responsive to receiving the selection input, identifying a content stream based on the selection input; and playing the identified content stream. The content selection user interface may include a grid of cells, each of the cells being associated with a content stream from the plurality of content streams, and wherein the selection input includes centering a cell of the grid in a field of view of the head-mounted display device to select the content stream associated with the cell.

In any of the aspects described herein, the content or content stream may include any media or data suitable for being provided by a device such as, for example, video and/or sound content. Properties of the environment may include sounds in the environment, location information, the current time, or any other information relating to the environment in which content is accessed or is accessible. In other words, identifying content based on an environment may involve assessing the context or scenario in which a device is situated and determining relevant content that may be of interest to a user of the device. Relevant content could include replays of content or any other information that supplements or enhances the content.

In the disclosed aspects, playback-initiation actions may include any actions by a user that indicate that the user desires to view a replay of or otherwise interact with any content. For example, playback-initiation actions may include a user picking up a content-playback device, a user orienting a content-playback device in a specific manner, and/or a head-mounted display device being mounted on a user. Any action performed by a user of a content-playback device that indicates that the user wishes to receive and/or view or otherwise interact with further content may be considered to be a playback-initiation action.

A content-playback position may be any item of data indicative of a position within an item of content. Such a position may indicate a position-of-interest within the content, such as an event that a user may be interested in seeing again. Additionally, a content-playback position could be selected such that supplementary or alternative content is synchronized (e.g. by determining an appropriate offset) with content being displayed on an external device.

The details of one or more implementations are set forth in the accompanying drawings and the description below. Other features will be apparent from the description and drawings, and from the claims.

BRIEF DESCRIPTION OF THE DRAWINGS

FIGS. 3A, 3B, and 3C are diagrams depicting an example head-mounted display device and controller, in accordance with implementations as described herein.

DETAILED DESCRIPTION

While watching content, such as a sporting event, on an external display device (e.g., a television), a user may want to view a replay of or otherwise interact with a portion of the content that was just shown on the external display device. A content-playback device, such as a head-mounted display device (HMD), can identify a content stream associated with the content on the external display device and synchronize the content stream with the content on the external display device to allow the user to view a replay or otherwise interact with the content. Technology to identify content playing on the external display device and detect an action by the user that indicates a desire to replay or otherwise interact with that content may enhance the user's experience and enjoyment of the content.

A content-playback device is a device that can be used to play a content stream. Non-limiting examples of a content-playback device include an HMD, a smartphone, and a tablet computing device. Although the examples herein generally relate to an HMD, other implementations that include other types of content-playback devices are possible too.

The content-playback devices described herein allow users to watch personal replays or otherwise interact with content playing on an external device and can allow an individual user to personalize his or her experience while watching content with a group of people. Further, viewing replays (or other interaction with content) using the content-playback device can provide a viewing experience that is not available on the external display device. For example, when the content-playback device includes an HMD, the content can fill the user's entire field of view, the content can emulate three-dimensions, etc. The ability to automatically identify a content stream associated with the external content and determine how to synchronize the content stream to that external content simplifies that user's interaction with the content-playback device and reduces the need for complex user interfaces on the HMD. Automatically identifying playback-initiation actions (e.g., that an HMD has been mounted on a user) simplifies the process of playing back content on the content-playback device and, therefore, can enhance the user's experience. Automatically identifying indications that the user is done watching the replay or otherwise interacting with the content (e.g., that a user has removed an HMD) can preserve battery life by disabling content playback and the display screens of the content-playback device when the device is not being used.

Figure 1:
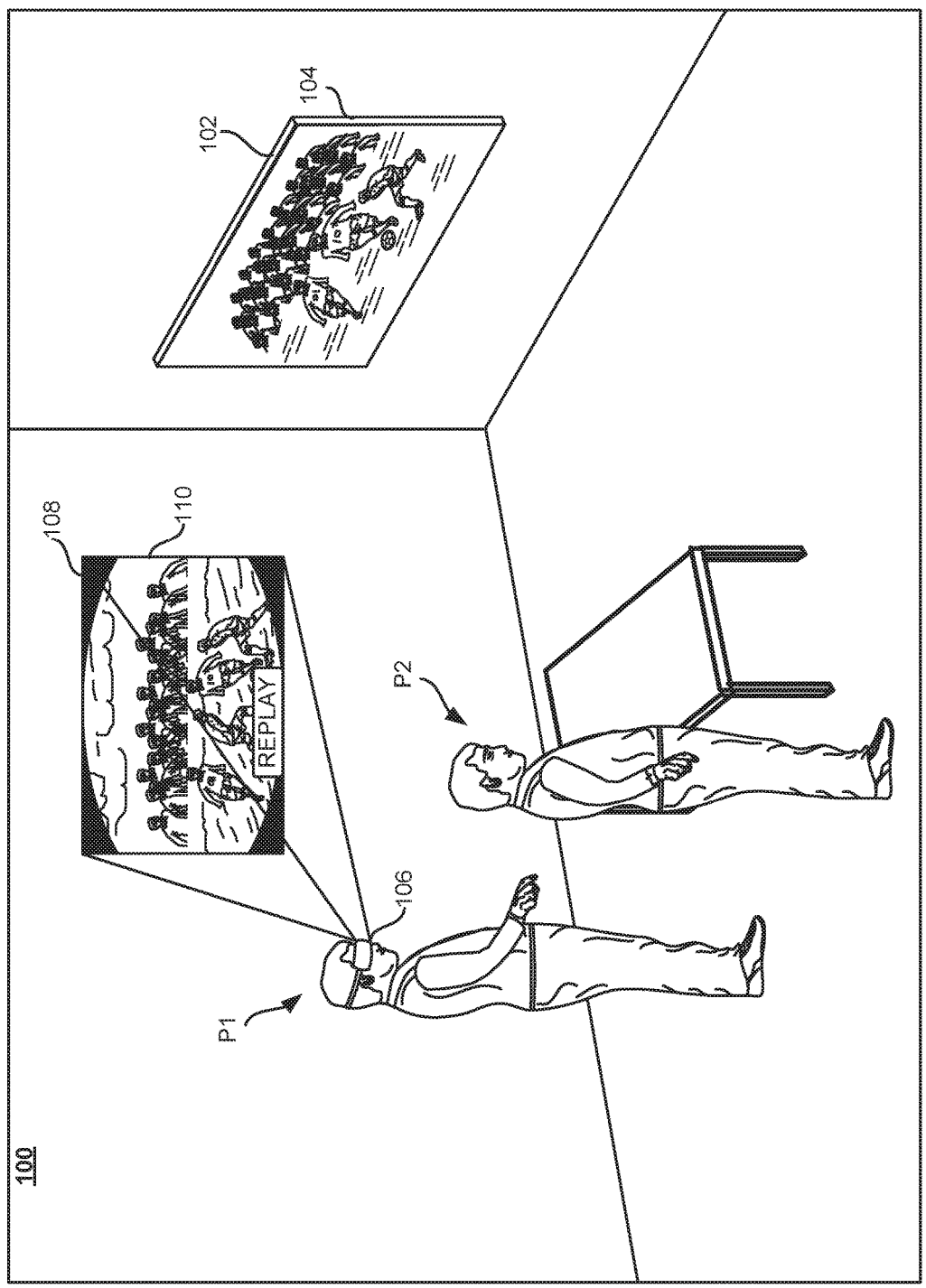
FIG. 1 is an example implementation of an augmented and/or virtual reality system including a head mounted display in communication with external input devices, in accordance with implementations as described herein.

FIG. 1 is a third person view of a physical space 100, in which a person P1 and a person P2 are watching an external display device 102 that is playing external content 104. In this example, the person P1 is using an HMD 106. Specifically, the HMD 106 has been mounted on the person P1 and is generating a virtual display 108 for the person P1. The virtual display 108 is displaying a replay from a content stream 110 that corresponds to the external content 104 being displayed by the external display device 102. As the person P1 watches the replay, the person P2 is able to continue watching the external content 104 on the external display device 102 without interruption.

The external display device 102 can be any type of device that plays content, such as video content. Non-limiting examples of the external display device 102 include a television, a projector, and a computer monitor. Although the examples herein are generally described with respect to an external display device 102, other implementations are possible that relate to external content playing on other types of external devices. For example, some implementations may relate to an external device that produces audio output only, such as a radio, stereo, or other type of audio playback device. In these implementations, the external content may be an audio signal produced by the external device.

The external display device 102 may receive the external content 104 from an antenna, cable, or satellite television signal. In some embodiments, the external display device 102 displays content that is received from a content streaming device. The external display device 102 can also display external content that is stored on a storage device, such as a DVD or Blu-Ray® disc or any other type of storage device. Additionally, the external display device 102 can display external content 104 that is transmitted and/or controlled by a computing device. The computing device can be a separate device (not shown in FIG. 1) or can be the HMD 106. For example, the HMD 106 may communicate with or control a streaming device that is providing the external content 104 that is being displayed on the external display device 102. In some implementations, the external display device 102 is separate from the HMD 106 and/or is not part of the HMD 106. For example, the external display device 102 may be outside of the housing of the HMD 106 and/or may not be physically connected to the HMD 106. For example, the HMD 106 may be independently movable with respect to the external display device 102. In some implementations, the external display device 102 is independent from the HMD 106. In some implementations, the external content 104 is content playing on the external display device 102. For example, the external content 104 may be content that is playing concurrently on the external display device 102. In at least some implementations, the external content 104 is unaffected by, is independent of, and/or continues playing regardless of any replay or playback of content on the HMD 106.

To enable a user, in this case person P1, to view a replay of the external content 104 or otherwise interact with the external content 104, the HMD 106 identifies a content stream 110 that is associated with the external content 104. The HMD 106 identifies the content stream 110 based on one or more properties of the environment (e.g., sounds in the environment) in which the HMD is located. For example, the HMD 106 can identify the external content 104 using acoustic fingerprint techniques, based on inference or user identification of currently available external content, and/or based on controlling or accessing information about the external content 104 (e.g., when the HMD 106 or a separate device that is using the same user account as the HMD 106 or is otherwise associated with the HMD 106 is controlling/communicating with a streaming device that provides the external content).

The HMD 106 may identify the external content 104 and/or the associated content stream 110 at various times, such as when the HMD 106 determines that the user desires to replay or otherwise interact with the content (e.g., upon detecting a playback-initiation action). The HMD 106 may also identify the external content 104 and/or the associated content stream 110 one or more times prior to the detection of such an action by the user. In this manner, the content stream 110 associated with the external content 104 can be cached to minimize the time delay for beginning playback. Using an acoustic fingerprint to identify content playing on the external display device 102 is an example of identifying content based on an environment in which the HMD 106 is located. The HMD 106 may also use other techniques to identify the external content 104 and/or the associated content stream 110 based on the environment too. For example, some implementations of the HMD 106 include a location determining technology (e.g., a global positioning system (GPS), a cellular triangulation system, and/or other location determination technologies) that can determine a location of the HMD 106. The HMD 106 may then use the determined location to determine the environment in which it is located and to identify content based on that environment. For example, the HMD 106 may use a determined location to query a table of environments to determine that the HMD 106 is located in a football stadium. The HMD 106 can then use that environment and/or location information to identify the external content 104 and/or the associated content stream 110.

In some situations, the HMD 106 may identify multiple content streams that are associated with the external content 104. In some implementations, the HMD 106 is configured to present a content selection user interface through which a content selection input may be received to select the content stream 110 from the multiple content streams associated with the external content 104. An example of the content selection user interface is a grid of content streams that are available. In some embodiments, the grid is a three-by-three grid of nine cells, each of which is associated with one content stream. In various embodiments, each cell of the grid displays a frame (e.g., a still image) or video from an associated content stream. The HMD 106 may be configured to display the content selection user interface on a display device of the HMD 106. The HMD 106 may be configured to receive various content selection inputs to select a specific content stream from the content selection user interface. For example, in some embodiments the content selection input includes the user orienting the front of the HMD 106 towards a cell of the grid within the field of view generated by the HMD 106. The HMD 106 may determine an orientation of the HMD 106 using an inertial measurement unit (IMU) of the HMD 106. The HMD 106 may also be configured to receive a content selection input via a pointer or beam generated by the HMD 106 based on input from a handheld controller associated with the HMD that a user aims at a desired grid cell. Other types of content selection inputs are possible too, such as voice (e.g., as captured by an audio sensor of the HMD 106) or tactile inputs (e.g., as captured via buttons, switches, or other physically actuatable controls of the HMD 106).

In some implementations, the HMD 106 records, with a microphone of the HMD 106, an audio sample of the sound from the environment around the HMD 106 and generates an acoustic fingerprint from that audio sample. The HMD 106 may then use the acoustic fingerprint to identify external content 104 that matches the generated acoustic fingerprint. The sound sample can be 1 second, 5 seconds, 10 seconds, or any other length in duration. The sound sample may be converted to an acoustic fingerprint by the HMD 106 or transmitted to an external computing device (e.g., a server accessed over the Internet) for conversion to an acoustic fingerprint. The acoustic fingerprint can then be compared (either by the HMD 106 or the external server) to a database of acoustic fingerprints to identify the external content 104 that is currently playing on the external display device 102. The database of acoustic fingerprints may include acoustic fingerprints that are generated from content that is currently being broadcast.

In some embodiments, the HMD 106 identifies the external content 104 based on the content of a specific type that is currently being broadcast. For example, embodiments of the HMD 106 (or an application running on the HMD 106) may be configured for specific types of events, such as sporting events (e.g., football games, basketball games, etc.). In these embodiments, the HMD 106 may access an index that lists the specific types of events being broadcast at a specific time. The index may be stored locally in a memory of the HMD 106 or may be retrieved from another computing device via a network. Using the index, the HMD 106 may infer the identity of the external content when only a single event of the specific type is being broadcast in the user's geographic location. Additionally, if multiple events of the specific type are being broadcast, the HMD 106 can generate a user interface that includes a list of events from which the user can select the one that is currently being watched.

Once the external content 104 is identified, the HMD 106 identifies a content stream 110 that is associated with the external content 104. For example, the HMD 106 may use an identifier associated with the external content 104 to query an index, database, or service that is stored locally or is available on a server accessible via the Internet for the identity of a content stream 110 associated with the external content 104. The content stream 110 can be provided, for example, by a content streaming service via a server accessible on the Internet. In some embodiments, the content stream 110 is accessed locally. The associated content stream 110 may include content that is identical to or similar to the external content 104. Additionally, the content stream may include content that is related but different than the external content 104 displayed by the external display device 102. For example, if the external display device 102 is displaying video from a sporting event, the associated content stream 110 may include a video stream captured by a different camera than the one providing the external content 104 to the external display device 102. The different camera may be located at a different position at the sporting event so as to provide the user with a different view of the sporting event. In some implementations, a replay content stream is provided from a dedicated replay camera. For example, video captured by the dedicated replay camera may only be accessible through the HMD 106 after a playback-initiation action is detected (e.g., the video from the dedicated replay camera may not be available on the external display device 102). Additionally, some implementations identify multiple content streams associated with the external content 104.

Additionally, the HMD 106 may synchronize the content stream 110 to the external content 104. For example, the HMD 106 may determine a synchronization position within the content stream 110 that corresponds to the currently playing external content 104. The HMD 106 can use the determined synchronization position to temporally align (or approximately align) the content stream 110 to the external content 104. The HMD 106 can determine the synchronization position using an acoustic fingerprint generated from an audio sample (e.g., captured/recorded with an audio sensor of the HMD 106) of the audio associated with the external content 104 being played on the external display device 102. The synchronization position corresponds to a position in the content stream 110 that is associated with the external content 104 currently playing on the external display device 102. In some implementations, the synchronization position is a position (e.g., a temporal offset) in the content stream 110 such that the content at the synchronization position in the content stream 110 corresponds to the external content 104 that is currently playing on the external display device 102. In some implementations, the content indicated by the synchronization position exactly corresponds or approximately corresponds to the currently playing external content.

In some embodiments, the HMD 106 initially calculates a synchronization position when it is turned on (or when a specific application on the HMD 106 is activated) and then periodically recalculates a synchronization position in the content stream 110. For example, the HMD 106 can recalculate the synchronization position every 3 seconds, 10 seconds, 1 minute, or any other time interval. Additionally, in some embodiments, the HMD 106 recalculates the synchronization position based on metadata that is included with or accompanies the content stream 110. For example, the metadata can identify positions in the content stream in which breaks of variable lengths may be taken during the broadcast of the corresponding external content 104. The HMD 106 may attempt to recalculate the synchronization position after one or more specific durations of time after the occurrence of a break identified in the metadata. Additionally, the HMD 106 is configured to recalculate the synchronization position when certain actions by the user are detected (e.g., when the user mounts the HMD 106 to view a replay or otherwise interact with the content).

The HMD 106 may also monitor for playback-initiation actions (e.g., actions by a user that indicate the user desires to view a replay or otherwise interact with the content). An example of a playback-initiation action is a device-mount event (e.g., that the HMD 106 has been mounted on a user). In some implementations, the HMD 106 uses various sensors to detect a device-mount event. For example, the HMD 106 may include an ambient light sensor and an IMU. In at least some of these implementations, the HMD 106 may detect a device-mount event based on a change in ambient light detected by the ambient light sensor of the HMD 106 and motion or orientation measurements from the IMU of the HMD 106. For example, in some implementations, the HMD 106 determines that it has been mounted on user based on ambient light measurements from the ambient light sensor falling below a specific threshold or changing by a predetermined amount because the user's face occludes ambient light from reaching the ambient light sensor of the HMD 106. As another example, some embodiments of the HMD 106 include a capacitive sensor that detects contact with skin, and the HMD 106 uses measurements from the capacitive sensor to determine that the user has mounted the HMD 106.

In some implementations, after the HMD 106 detects a playback-initiation action, the HMD 106 determines a content-playback position based on the synchronization position. For example, to allow the user to view a replay, the HMD 106 may determine a content-playback position by offsetting from the synchronization position by a predetermined duration of time (e.g., a replay time offset). Non-limiting examples of the predetermined duration of time include 1 second, 5 seconds, 10 seconds, and 15 seconds. Additionally, the content stream 110 may include annotations to identify points of interest (such as the beginning of a play, scene, sentence, chapter, verse, song, etc.), and the HMD 106 may determine the content-playback position by selecting a point of interest occurring prior to the synchronization position. The HMD 106 may store the content-playback position in a memory device. In some implementations, the HMD 106 can provide additional types of related content that the user can view, such as video streams filmed from different cameras than the camera(s) that are capturing the video included in the external content 104. The HMD 106 may be configured to receive user inputs to rewind the content stream further (e.g., adjust the content-playback position by an additional predetermined amount one or more times) or to play the content in slow-motion or fast-forward. The HMD 106 may play content in slow motion or fast forward by triggering playback of the content stream at a different frame rate than the video included in the content stream was captured.

The HMD 106 may also be configured to detect device-unmount events (e.g., when the user removes the HMD 106). For example, the HMD 106 may detect a device-unmount event, based on detecting, with an ambient light sensor of the HMD 106, an increase in ambient light levels. Upon detecting that the HMD 106 has been removed, some embodiments update the synchronization position to re-synchronize to the external content 104 being played by the external display device 102. Some embodiments continue to maintain a playback session associated with the previous detection of a playback-initiation action. The HMD 106 may maintain the session until the HMD 106 determines that it has been set down (e.g., placed on a table as determined based on orientation or lack of movement detected, for example, by an IMU of the HMD 106) or until a predetermined time threshold elapses without the HMD 106 detecting a device-mount event. If instead, the HMD 106 detects that it has been mounted on a user for a second time, the HMD 106 may begin playback at the previously determined content-playback position. For example, the HMD 106 may be configured to detect a device-mount event, initiate a playback session based on the detected device-mount event, playback content within the playback session starting at a determined content-playback position, detect a device-unmount event, stop playback of content within the playback session in response to the detected device-unmount event, maintain the playback session after the detected device-unmount event for a predetermined time period and/or until detecting that the HMD 106 has been set down, detect a second device-mount event while the playback session is being maintained, and/or playback content again within the playback session starting at the determined content-playback position. In this manner, multiple users can share the HMD 106 to watch the same replay or a user can watch the same replay multiple times by unmounting the HMD 106 (e.g., taking the HMD 106 off) and re-mounting the HMD 106 (e.g., putting it back on).

In some embodiments, after the HMD 106 terminates a content-playback session, a bookmark into the content stream is stored to indicate the content-playback position. The HMD 106 may store the bookmark in a memory device. The HMD 106 may be configured to retrieve, from the memory device, the stored bookmark or bookmarks at a later time (e.g., based on receiving a user input indicating a desire to review previously stored bookmarks in the content stream 110). The HMD 106 may store multiple bookmarks during the course of a user watching the external content 104 on the external display device 102, which the HMD 106 can later access to generate a personal highlight reel for the user (e.g., by sequentially showing portions of the content stream following each of the bookmarks). In some implementations, the HMD 106 is configured to allow the user to share the personal highlight reel, for example, via social media or otherwise. In some implementations, the HMD 106 may transmit the stored bookmark(s) to a computing device over the Internet, which may then aggregate bookmarks from several users watching the same external content 104 to identify the most-replayed portions of the external content 104 or the associated content streams.

In at least some embodiments, the display panels of the HMD 106 are deactivated until such an action is detected to, for example, reduce the power consumption by the HMD 106 and increase the battery life of the HMD 106. Once such an action is detected, the HMD 106 can then initiate a replay by beginning playback by temporally offsetting the content stream 110 from the current synchronization position to a replay-playback position. For example, the replay-playback position may be determined by offsetting to a location that precedes (i.e., is before) the current synchronization position by a specific duration of time. For example, the HMD 106 may begin playback of the content stream 110 at a point that is offset to five seconds before the current synchronization position.

Some embodiments of the HMD 106 include user interface elements that receive user inputs to allow the user to interact with the content stream 110 in various ways. The user interface elements include physical user interface elements such as buttons, switches, and touch sensitive surfaces and virtual user interface elements that are generated within the user's field of view on the virtual display 108.

An example HMD 106 includes a button and is configured to offset further back (e.g., rewind) by a predetermined amount into the content stream when a user presses the button. Additionally, if the user holds the button down, the HMD 106 causes the content stream 110 to playback in slow motion. For example, a hold may be detected when the button is depressed for longer than a predetermined duration, such as 0.5 seconds, 1 second, 1.5 seconds, or another duration.

Some embodiments also include user interface elements that allow a user to request fast motion playback of the content stream 110, to select a different camera feed or otherwise reposition the view of the content stream 110 shown on the virtual display 108.

When the user is done watching the replay, the user may take off the HMD 106. If the user then sets the HMD 106, the HMD 106 will detect the lack of motion and will recalculate the synchronization position for the content stream 110. In some embodiments, the HMD 106 also stores (locally or on a server) a bookmark that identifies the replay-playback position.

The user may pass the HMD 106 to another person, for example person P2, after watching the replay. In this situation, the person P2 may desire to watch the same replay. In some embodiments of the HMD 106 if it is detected that the HMD 106 has been mounted again before being set down, the HMD 106 will again resume playback of the content stream 110 at the replay-playback position. However, once the HMD 106 is set down and then picked up again, the HMD 106 will identify a new replay-playback position.

Figure 2:
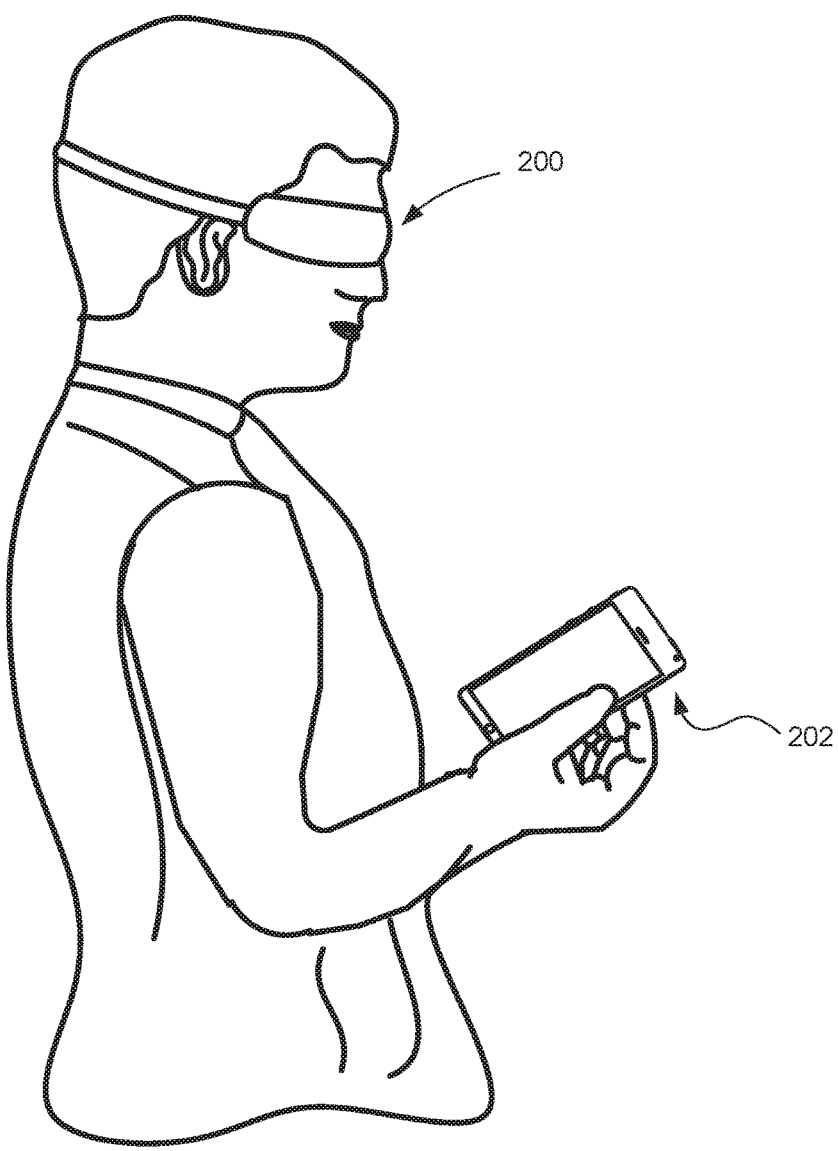
FIG. 2 is a diagram depicting an example head-mounted display device.

FIG. 2 illustrates an example implementation of an HMD as shown in FIG. 1. In FIG. 1, a user wearing an HMD 200 is holding a portable handheld electronic device 202. The handheld electronic device 202 may be, for example, a smartphone, a controller, a joystick, or another portable handheld electronic device(s) that may be paired with, and communicate with, the HMD 200 for interaction in the immersive environment generated by the HMD 200. The handheld electronic device 202 may be operably coupled with, or paired with the HMD 200 via, for example, a wired connection, or a wireless connection such as, for example, a WiFi or Bluetooth connection. This pairing, or operable coupling, of the handheld electronic device 202 and the HMD 200 may provide for communication between the handheld electronic device 202 and the HMD 200 and the exchange of data between the handheld electronic device 202 and the HMD 200. This may allow the handheld electronic device 202 to function as a controller in communication with the HMD 200 for interacting in the immersive environment generated by the HMD 200 (e.g., to rewind further, to trigger playback of the content stream in slow-motion or fast-motion, to reorient or change camera views, to zoom in/out). That is, a manipulation of the handheld electronic device 202, such as, for example, a beam or ray emitted by the handheld electronic device 202 and directed to a portion of the immersive environment such as virtual user interface element, and/or an input received on a touch surface of the handheld electronic device 202, and/or a movement of the handheld electronic device 202, may be translated into a corresponding command, selection, or movement, or other type of interaction, in the immersive environment generated by the HMD 200. For example, the HMD 200, together with the handheld electronic device 202, may generate an immersive environment to show replays and allow a interaction with a content stream as described above, and the handheld electronic device 202 may be manipulated to effect a change in playback of the content stream and/or scale or perspective of the user relative to the content stream as described above.

FIGS. 3A and 3B are perspective views of an example HMD, such as, for example, the HMD 200 worn by the user in FIG. 2, and FIG. 3C illustrates an example handheld electronic device, such as, for example, the handheld electronic device 202 shown in FIG. 2.

The handheld electronic device 302 may include a housing 303 in which internal components of the device 302 are received, and a user interface 304 on an outside of the housing 303, accessible to the user. The user interface 304 may include a touch sensitive surface 306 configured to receive user touch inputs. The user interface 304 may also include other components for manipulation by the user such as, for example, actuation buttons, knobs, joysticks and the like. These components of the user interface 304 may be used to provide inputs and to trigger various actions with respect to content that is being displayed in the HMD 300. For example, the HMD 300 may change the speed of playback of content (e.g., to slow motion or fast motion) based on the actuation of one the components. In some implementations, actuation of one of the components may also adjust the content-playback position within the content stream being played back. For example, actuating a first component may cause the HMD 300 to adjust the content-playback position back (i.e., temporally earlier in the content stream) by a predetermined duration of time (e.g., 5 seconds), while actuating a second component may cause the HMD 300 to adjust the content-playback position forward (i.e., temporally later in the content stream) by the predetermined duration of time. The HMD 300 may then resume playback of the content from the adjusted content-playback position. Additionally, when the HMD 300 detects actuation of various of the components, the HMD 300 may perform various other actions, such as, triggering playback of a content stream, stopping/pausing playback of a content stream, and/or selecting a different content stream for playback.

In some implementations, at least a portion of the user interface 304 may be configured as a touchscreen, with that portion of the user interface 304 being configured to display user interface items to the user, and also to receive touch inputs from the user on the touch sensitive surface 306. The handheld electronic device 302 may also include a light source 308 configured to selectively emit light, for example, a beam or ray, through a port in the housing 303, for example, in response to a user input received at the user interface 304.

The HMD 300 may include a housing 310 coupled to a frame 320, with an audio output device 330 including, for example, speakers mounted in headphones, also being coupled to the frame 320. In FIG. 3B, a front portion 310a of the housing 310 is rotated away from a base portion 310b of the housing 310 so that some of the components received in the housing 310 are visible. A display 340 may be mounted on an interior facing side of the front portion 310a of the housing 310. Lenses 350 may be mounted in the housing 310, between the user's eyes and the display 340 when the front portion 310a is in the closed position against the base portion 310b of the housing 310. In some implementations, the HMD 300 may include a sensing system 360 including various sensors and a control system 370 including a processor 390 and various control system devices to facilitate operation of the HMD 300.

In some implementations, the HMD 300 may include a camera 380 to capture still and moving images. The images captured by the camera 380 may be used to help track a physical position of the user and/or the handheld electronic device 302 in the real world, or physical environment relative to the immersive environment, and/or may be displayed to the user on the display 340 in a pass through mode, allowing the user to temporarily leave the immersive environment and return to the physical environment without removing the HMD 300 or otherwise changing the configuration of the HMD 300 to move the housing 310 out of the line of sight of the user.

For example, in some implementations, the sensing system 360 may include an inertial measurement unit (IMU) 362 that includes various different types of sensors such as, for example, an accelerometer, a gyroscope, a magnetometer, and other such sensors. A position and orientation of the HMD 300 may be detected and tracked based on data provided by the sensors included in the IMU 362. The detected position and orientation of the HMD 300 may allow the system to in turn, detect and track the user's head, gaze direction, and/or movement. Based on the determined position and orientation of the HMD 300, the HMD 300 may receive inputs to select a content stream from a content selection user interface that presents multiple available content streams (e.g., based on determining which cell in a grid of the content selection user interface the user is looking at/oriented toward). The sensing system 360 may also include an ambient light sensor and/or a capacitive sensor. The HMD 300 may use the ambient light sensor and/or the capacitive sensor to detect a device-mount event. In some implementations, measurements from the IMU are also used to detect a device-mount event. The ambient light sensor may be disposed on the HMD 300 such that the ambient light sensor measures an ambient light level near the user's eyes when the HMD 300 is mounted. For example, the HMD 300 may identify a device-mount event based on detecting a decrease in measurements from the ambient light sensor when the IMU indicates the HMD 300 is oriented approximately horizontally (e.g., a lateral axis of the HMD 300 is within a predetermined threshold of parallel to the horizontal direction). These measurements may occur when the HMD 300 is mounted on a user's head and the user's head/face is blocking ambient light from reaching the ambient light sensor. The capacitive sensor may be disposed on the HMD 300 so as to make contact with the user's skin when the HMD 300 is mounted. In some implementations, the HMD 300 identifies a device-mount event based on detecting skin contact via the capacitive sensor when the HMD 300 is oriented approximately horizontally.

In some implementations, the HMD 300 may include a gaze tracking device 365 to detect and track an eye gaze of the user. The gaze tracking device 365 may include, for example, an image sensor 365A, or multiple image sensors 365A, to capture images of the user's eyes, for example, a specific portion of the user's eyes, such as, for example, the pupil, to detect, and track direction and movement of, the user's gaze. In some implementations, the HMD 300 may be configured so that the detected gaze is processed as a user input to be translated into a corresponding interaction in the immersive virtual experience.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 4:
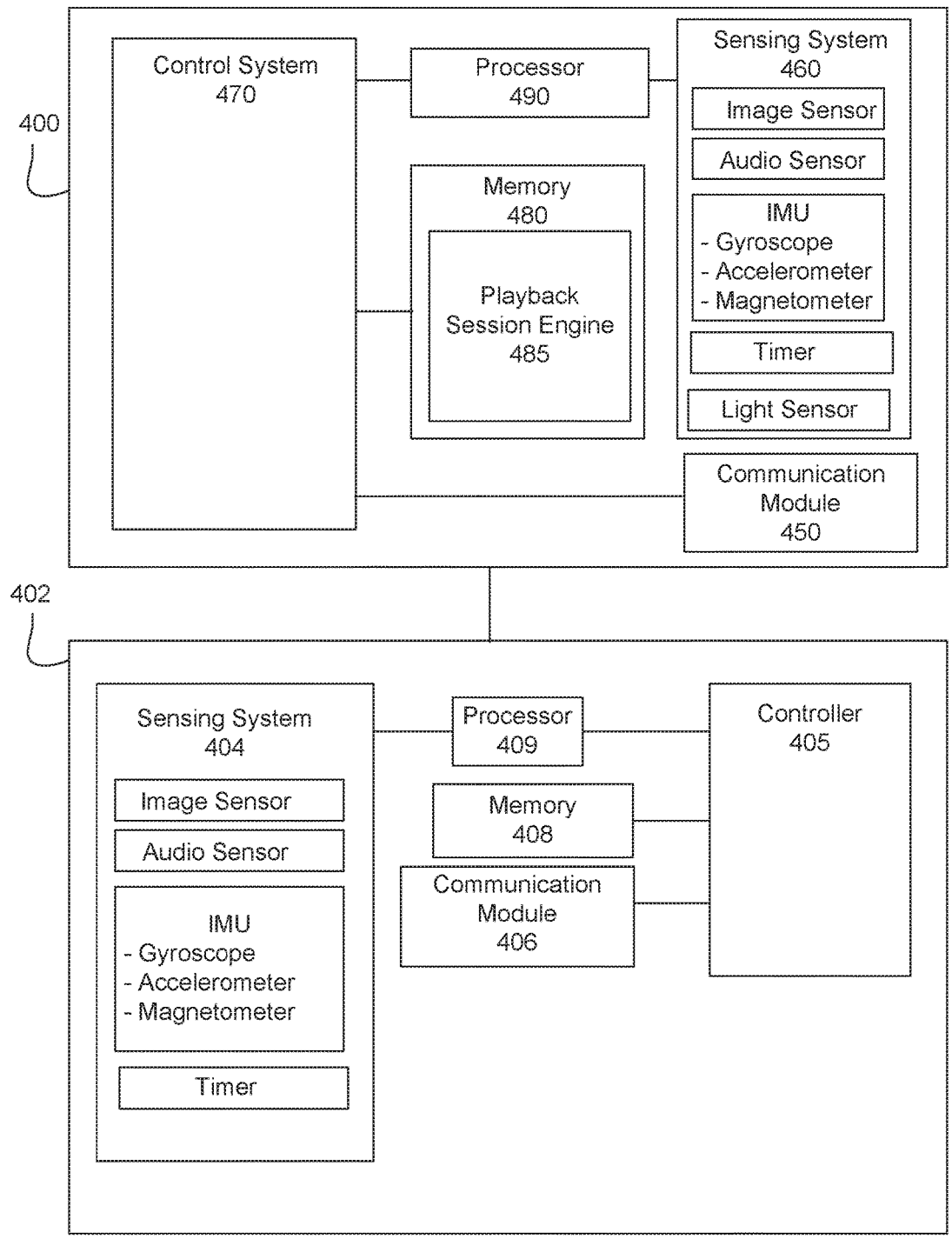
FIG. 4 is a block diagram of a head-mounted display device, in accordance with implementations as described herein.

A block diagram of a system, in accordance with implementations described herein, is shown in FIG. 4. The system may include a first electronic device 400 (such as, for example, an HMD as described above with respect to FIGS. 1, 2, and 3A-3B), and at least one second electronic device 402 (such as, for example, a handheld electronic device as described above with respect to FIGS. 1, 2, and 3A-3B, or other external device) in communication with the first electronic device 400.

The first electronic device 400 may include a sensing system 460 and a control system 470, which may be similar to the sensing system 360 and the control system 370, respectively, shown in FIGS. 3A and 3B. The sensing system 460 may include different types of sensors, including, for example, an ambient light sensor, an audio sensor, an image sensor, a distance and/or proximity sensor, a contact sensor such as a capacitive sensor, an IMU including, for example, a gyroscope, an accelerometer, a magnetometer and the like, a timer, and/or other sensors and/or different combination(s) of sensors. The control system 470 may include, for example, a power/pause control device, audio and video control devices, an optical control device, a transition control device, and/or other such devices and/or different combination(s) of devices. The sensing system 460 and/or the control system 470 may include more, or fewer, devices, depending on a specific implementation. The elements included in the sensing system 460 and/or the control system 470 may have a different physical arrangement (e.g., different physical location) within, for example, an HMD other than the HMD 300 shown in FIGS. 3A and 3B. The first electronic device 400 may also include a memory 480, and a processor 490 in communication with the sensing system 460 and the control system 470. The memory 480 may include playback session engine 485 that is configured to cause the first electronic device to identify and playback content. In some implementations, the playback session engine 485 may include instructions that, when executed by the processor 490, cause the system to perform operations similar to those described with respect to the method 600 and the method 700.

The processor 490 may process inputs received from the sensing system 460, as well as from other external sources such as, for example, the second electronic device 402, and execute instructions corresponding to the detected inputs. The first electronic device 400 may also include a communication module 450 providing for communication between the first electronic device 400 and other, external computing devices, such as, for example, the second electronic device 402 and other computing devices involved in handling system related information.

The second electronic device 402 may include a communication module 406 providing for communication and data exchange between the second electronic device 402 and another device, such as, for example, the first electronic device 400. In some implementations, depending on a specific configuration of the second electronic device 402 (i.e., a handheld electronic device or controller, versus a keyboard or a mouse), the second electronic device 402 may include a sensing system 404 including, for example, an image sensor and an audio sensor, such as is included in, for example, a camera and microphone, an IMU, a timer, a touch sensor such as is included in a touch sensitive surface of a handheld electronic device, or smartphone, and other such sensors and/or different combination(s) of sensors. A processor 409 may be in communication with the sensing system 404 and a controller 405 of the second electronic device 402, the controller 405 having access to a memory 408 and controlling overall operation of the second electronic device 402.

Figure 5:
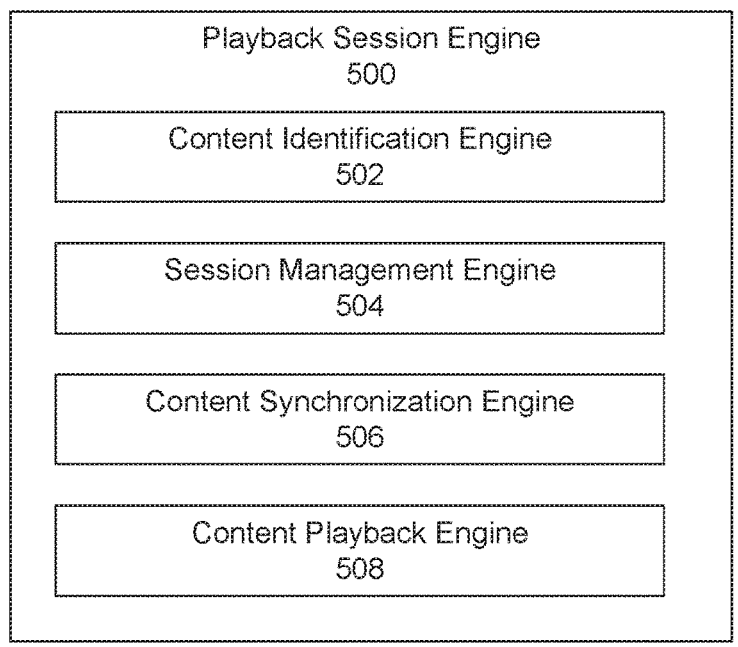
FIG. 5 is a block diagram of an example playback session engine, in accordance with implementations as described herein.

Turning now to FIG. 5, a block diagram of an example implementation of a playback session engine 500 is shown. The playback session engine 500 is an example of the playback session engine 485. In some implementations, the playback session engine 500 includes a content identification engine 502, a session management engine 504, a content synchronization engine 506, and a content playback engine 508.

The content identification engine 502 identifies content based on the environment in which a HMD is located. For example, the content identification engine 502 may identify content being shown on an external display device. The content identification engine 502 may identify content based on an acoustic fingerprint generated from a captured audio recording. In some implementations, the content identification engine 502 identifies content based on a location of the HMD. The content identification engine may also identify content based on time of day and/or a schedule of events.

The session management engine 504 initiates, pauses, and terminates content-playback sessions. In some implementations, the session management engine 504 initiates a content-playback session in response to detecting a device-mount event (e.g., a user has put on the HMD). Likewise, the session management engine 504 may pause a content-playback session in response to detecting a device-unmount event (e.g., a user has taken off/unmounted the HMD) and terminate a content-playback session in response to detective the device has been set down. In some implementations, the session management engine 504 may also initiate, pause, or terminate a content-playback session based on a user input.

The content synchronization engine 506 determines a synchronization position within a content stream that corresponds to content identified by the content identification engine 502. For example, the content synchronization engine 506 may identify a time in a content stream that includes content that matches or was captured at the currently playing moment of the identified content. In some implementations, the content stream is identical to the identified content. For example, the synchronization engine may identify the frame within a content stream that is identical to the frame being played by the external display device. The content stream can also be different than the content being played back on the external display device. For example, the content stream can include footage from a different camera feed of the event being shown on the external display device. In this case, the content synchronization engine 506 may identify a frame in the content stream that was filmed at the same time as the frame that is current being displayed on the external display device.

The content playback engine 508 causes the HMD to playback the content from the content stream based on the synchronization position determined by the content synchronization engine 506. For example, the content playback engine 508 may trigger playback of the content using a streaming video player application. In some implementations, the content playback engine 508 plays back content based on an offset before the synchronization position so as to act as an instant replay. The content playback engine 508 may include a video player or a stereoscopic video player. In some implementations, the content is played back at a different speed than it was recorded (e.g., in slow motion or fast motion). For example, content that was captured at 24 frames per second may be played back in slow motion by displaying 12 frames per second during playback.

Figure 6:
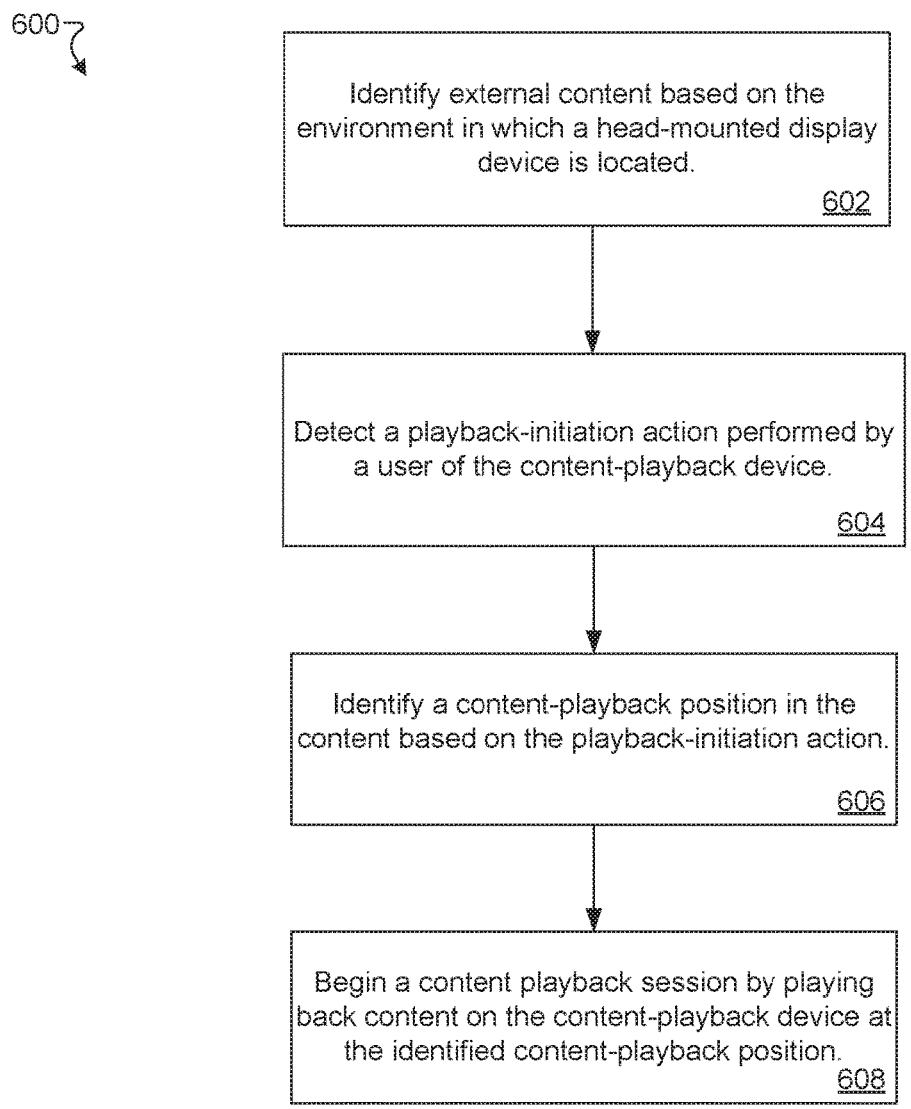
FIG. 6 is a flowchart of a method, in accordance with implementations as described herein.

A method 600 of playing back content based on an environment in which a content-playback device is located, in accordance with implementations as described herein, is shown in FIG. 6.

At operation 602, external content is identified based on the environment in which an HMD is located. For example, the external content may be identified based on an acoustic fingerprint generated from an audio recording captured by a microphone of the HMD. The external content may also be identified based, at least in part, on the physical location of the HMD or the current time. For example, the physical location and the current time may be used to identify content that may be playing at the time (e.g., by consulting an index such as a content programming guide).

At operation 604, a playback-initiation action performed by a user of the content-playback device is detected. The playback-initiation action is an action detected by the HMD (or other type of content-playback device) that initiates playback of content. The playback-initiation action may indicate that a user desires to view a replay or other content. For example, the playback-initiation action performed by the user may include a device-mount event (e.g., the device has been mounted on the user's head). The device-mount event may be detected based on one or more of the following factors: movement of the HMD, the orientation of the HMD, and light levels detected by an ambient light sensor within the HMD (e.g., the light sensor of the sensing system 460). Other examples of playback-initiation actions include picking up a content-playback device and orienting a content-playback device in a specific manner.

At operation 606, a content-playback position in the content based on the playback-initiation action is identified. Similar to identifying the external content, the content-playback position may be identified based on one or more of an audio fingerprint generated from a recording, the location of the HMD, and the current time. In some implementations, a content-synchronization position is determined. For example, the content-synchronization position may correspond to the position in a content stream that corresponds to the position of the currently playing identified external content. The content-playback position may then be offset from the content-synchronization position to allow for a replay effect. For example, the content-playback position may be offset by a predetermined amount of time, such as ten seconds, fifteen seconds, or thirty seconds. The content-playback position may also be offset from the content-synchronization position based on bookmarks or annotated points of interest in the content (e.g., the beginning of plays in a sporting event may be annotated so that the content-playback position is set to the beginning of a play that occurred immediately before the detection of the playback-initiation action).

At operation 608, a content-playback session is started by playing back content on the content-playback device at the identified content-playback position. In some implementations, the content-playback session is started by triggering playback of the content. For example, the content may be played back from a content stream associated with the identified external content. In some implementations, the content stream includes content that is identical to the identified external content. The content stream can also include content that is different than the identified external content (e.g., the content from the content stream may be captured from a different camera view or may include supplemental information). In some implementations, multiple content streams related to the identified external content are available and the user may be prompted to select one of the content streams.

In some implementations, a session-termination action may be detected while the content-playback session is active. For example, the session-termination action may be an action that indicates that the user taken off the HMD and set the HMD down. Detecting the session-termination action may include detecting a device-unmount event. The device-unmount event may be detected based on one or more of the following factors: movement of the HMD, the orientation of the HMD, and light levels detected by an ambient light sensor within the HMD. In some implementations, the session-termination action is detected when a device-unmount event is detected and a predetermined time period has elapsed without a device-mount event being detected.

Figure 7:
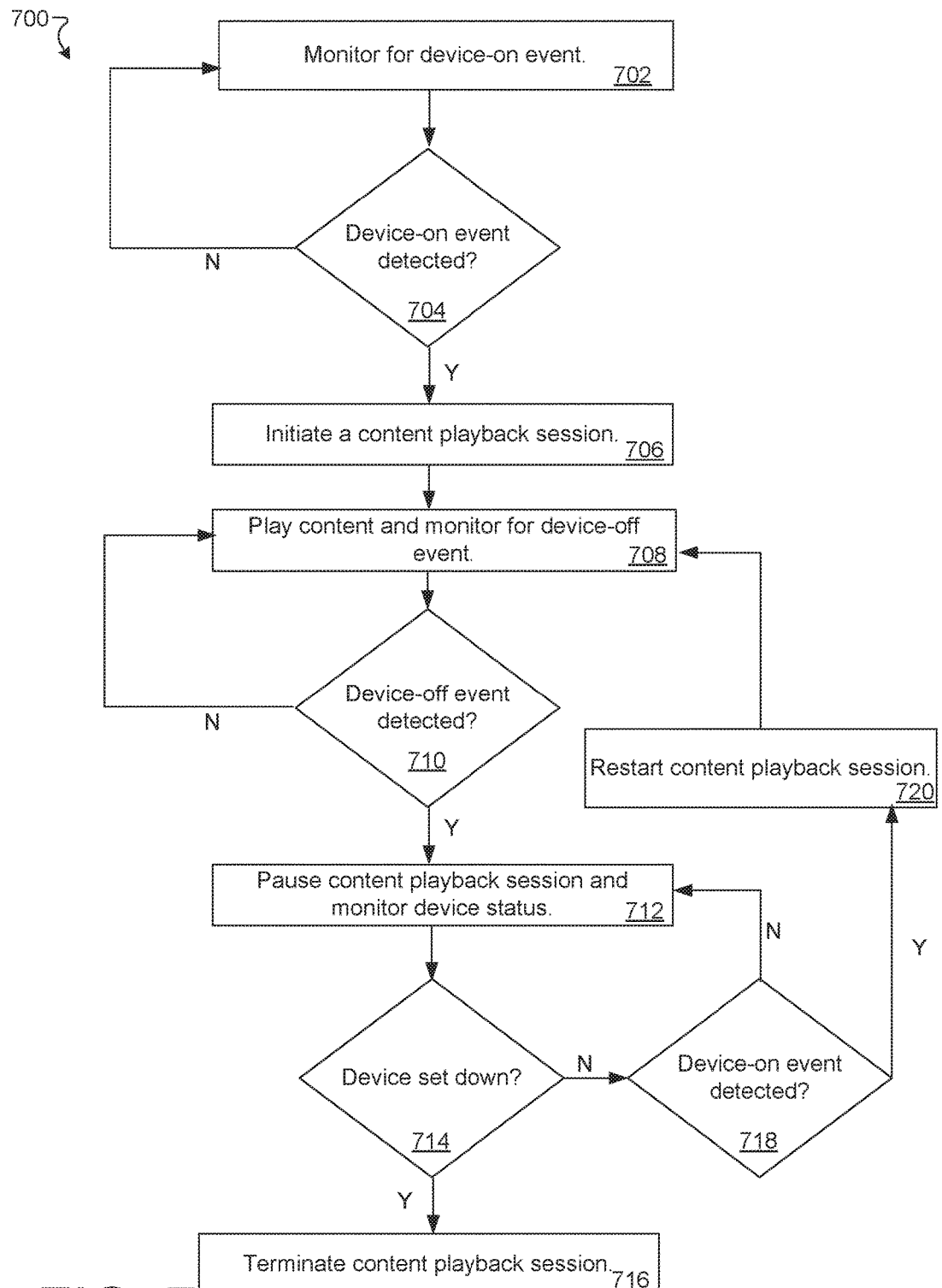
FIG. 7 is a flowchart of a method, in accordance with implementations as described herein.

A method 700 of initiating and terminating a content-playback session, in accordance with implementations as described herein, is shown in FIG. 7.

At operation 702, an HMD monitors for a device-mount event. Examples of device-mount events are described above at least with respect to detecting when the HMD is mounted on a user's head. The device-mount event can be detected using various sensors of the HMD. For example, one or more of the ambient light sensor and the IMU can be used to detect a device-mount event. For example, upon detecting movement using the IMU, the orientation of the device and measurements from the ambient light sensor may be compared to predetermined ranges or thresholds to determine whether the HMD has been mounted on a user. The ambient light sensors can be absolute light level thresholds or be based on changes in ambient light. Additionally, the measurements from the ambient light sensors may be adjusted to compensate for light from the HMD that is reflected off of the user's face. In some implementations, a machine learning model may be used to recognize device-mount events based on measurements from the ambient light sensor and/or the IMU.

At operation 704, it is determined whether a device-mount event has occurred. If so, the method proceeds to operation 706 where a content-playback session is initiated. As discussed above, a content stream is played back based on content being played on an external display device (e.g., to provide a replay). If a device-mount event is not detected, the method returns to operation 702 to continue monitoring for a device-mount event.

At operation 708, the HMD plays content (or triggers content playback) and monitors for a device-unmount event. The device-unmount event may be determined based on similar measurement and sensors as are used to detect a device-mount event.

At operation 710, it is determined whether a device-unmount event has occurred. If so, the method proceeds to operation 712, where the content-playback session is paused and the device status is monitored. If not, the method returns to operation 708, to continue playing content and monitoring for a device-unmount event.

At operation 714, it is determined whether the HMD is set down. In some embodiments, determining that the HMD is set down is based on measurements from the IMU. For example, if movement is not detected for more than a predetermined threshold of time (e.g., 5 seconds) it is determined that the HMD has been set down. Additionally, some embodiments determine whether the HMD has been set down based on a combination of orientation and movement. For example, if the HMD is oriented facing down, a shorter threshold of no movement (e.g., 2 seconds) is used than when the HMD is oriented otherwise. Additionally, some embodiments determine that the HMD has been set down if a device-mount event is not detected for a predetermined time period (e.g., 10 seconds). If it is determined that the HMD is set down, the method proceeds to operation 716 where the content-playback session is terminated.

If at operation 714, it is determined that the device is not set down, the method proceeds to operation 718, where it is determined whether a device-mount event has been detected. If so, the method proceeds to operation 720 where the content-playback session is restarted. This allows one user to hand the HMD to a second user so that the second user can watch the same replay. If a device-mount event is not detected at operation 718, the method returns to operation 712, where the content session remains paused and the HMD continues to monitor the device status.

Figure 8:
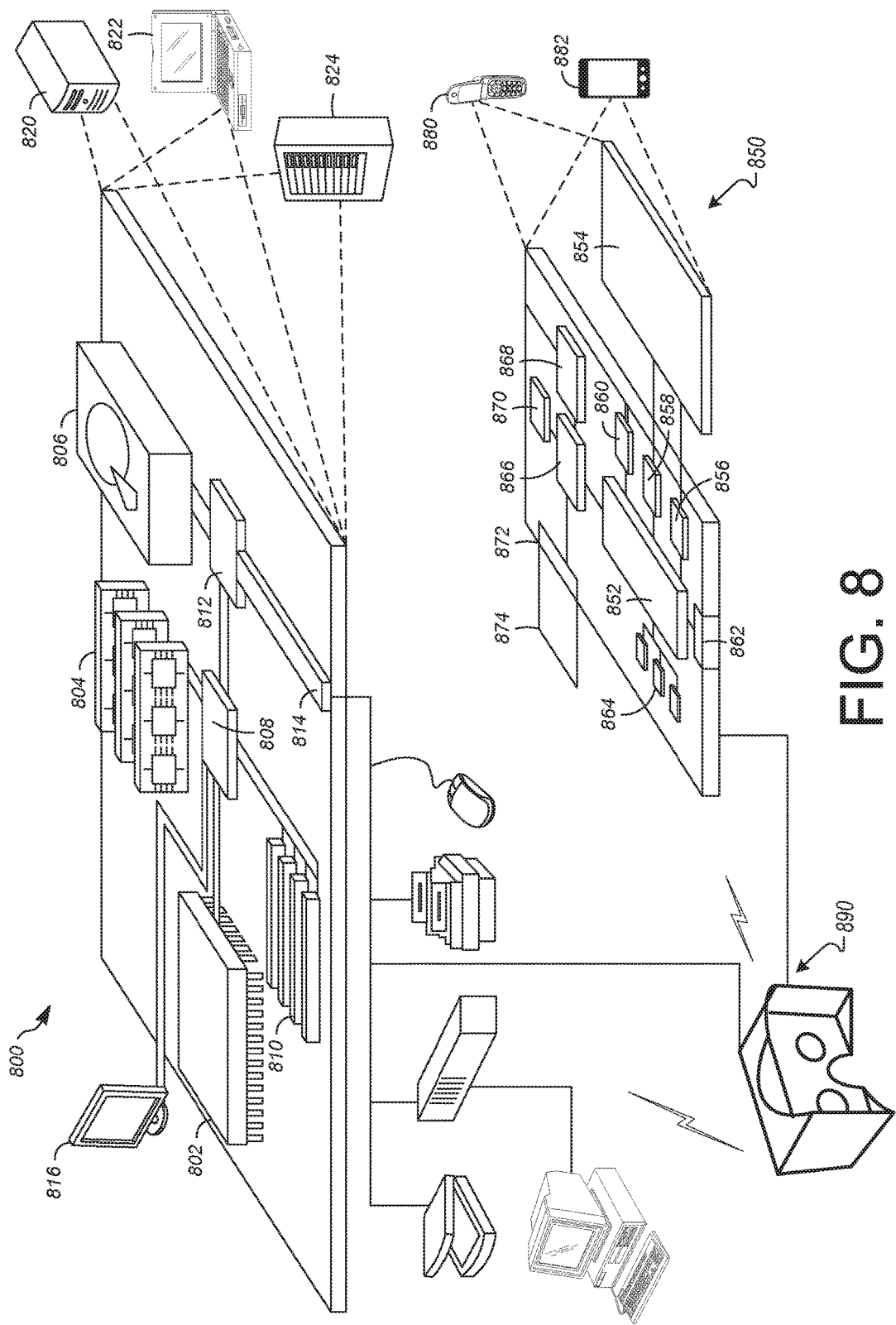
FIG. 8 shows an example of a computing device and a mobile computing device that can be used to implement the techniques described herein.

FIG. 8 shows an example of a computing device 800 and a mobile computing device 850, which may be used with the techniques described here. Computing device 800 includes a processor 802, memory 804, a storage device 806, a high-speed interface controller 808 connecting to memory 804 and high-speed expansion ports 810, and a low-speed interface controller 812 connecting to low-speed expansion ports 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed interface controller 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed interface controller 808 manages bandwidth-intensive operations for the computing device 800, while the low-speed interface controller 812 manages lower bandwidth-intensive operations. Such allocation of functions is exemplary only. In one implementation, the high-speed interface controller 808 is coupled to memory 804, display 816 (e.g., through a graphics processor or accelerator), and to high-speed expansion ports 810, which may accept various expansion cards (not shown). In the implementation, the low-speed interface controller 812 is coupled to storage device 806 and low-speed expansion ports 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may include appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset/HMD device 890) to generate an immersive environment for viewing replays and interacting with content. For example, one or more sensors included on a computing device 850 or other computing device depicted in FIG. 8, can provide input to VR headset 890 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR space that can then be used as input to the VR space. For example, the computing device 850 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a specific action to occur in the VR space.

In some implementations, a touchscreen of the computing device 850 can be rendered as a touchpad in VR space. A user can interact with the touchscreen of the computing device 850. The interactions are rendered, in VR headset 890 for example, as movements on the rendered touchpad in the VR space. The rendered movements can control virtual objects in the VR space.

In some implementations, one or more output devices included on the computing device 850 can provide output and/or feedback to a user of the VR headset 890 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. In the example of the laser pointer in a VR space, the computing device 850 appears as a virtual laser pointer in the computer-generated, 3D environment. As the user manipulates the computing device 850, the user in the VR space sees movement of the laser pointer. The user receives feedback from interactions with the computing device 850 in the VR environment on the computing device 850 or on the VR headset 890.

In some implementations, a computing device 850 may include a touchscreen. For example, a user can interact with the touchscreen in a specific manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 800 is intended to represent various forms of digital computers and devices, including, but not limited to laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Although many of the examples above relate to providing replays of televised sporting events, the technologies described are not so limited. The HMD can be used to provide replays at live sporting events. In this case, the appropriate content stream may be identified by user input, a wireless network available at the sporting event, GPS location of the HMD, or other methods. The HMD can also be used to provide replays or additional content at live theatre, opera, and movies. For example, the HMD can provide translation or captioning services when worn. Additionally, the HMD can provide alternative character views or content during movies. In some cases, the HMD may track the alternative content that the user has accessed and guide the user to find additional alternative or extra content available during the movie.

A number of embodiments have been described. Nevertheless, it will be understood that various modifications may be made without departing from the spirit and scope of the specification.

In addition, the logic flows depicted in the figures do not require the specific order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising: identifying content based on content playing on an external display device in an environment in which a content-playback device is located; detecting a playback-initiation action performed by a user of the content-playback device by detecting a device-mount event based on a change in ambient light detected by an ambient light sensor of the content-playback device and at least one of motion or orientation measurements from the content-playback device; identifying a content-playback position based on the playback-initiation action; and triggering playback of a replay of a portion of the content playing on the external display device on the content-playback device based on the identified content-playback position, wherein the content playing on the external display device is unaffected by playback of the replay on the content-playback device.

2. The method of claim 1, wherein the identifying content based on the environment in which the content-playback device is located includes identifying external content playing on an external display device that is separate from the content-playback device.

3. The method of claim 2, wherein the identifying content based on the environment in which the content-playback device is located includes:
   recording an audio sample using a microphone of the content-playback device;
   generating an acoustic fingerprint based on the audio sample; and
   using the acoustic fingerprint to identify the external content playing on the external display device.

4. The method of claim 1, wherein the identifying content based on the environment in which the content-playback device is located includes:
   determining a location of the content-playback device; and
   identifying content that is currently available in the determined location.

5. The method of claim 1, wherein the identifying a content-playback position based on the playback-initiation action includes:
   determining a content-synchronization position for the identified content; and
   determining the content-playback position by offsetting the content-synchronization position by a replay time offset.

6. The method of claim 1, further comprising:
   detecting a device-unmount event; and
   responsive to detecting the device-unmount event, terminating content playback on the content-playback device.

7. A computing device comprising: at least one processor; and memory storing instructions that, when executed by the at least one processor, cause the computing device to: identify content based on content playing on an external display device in an environment in which a content-playback device is located; detect a playback-initiation action performed by a user of the content-playback device by detecting a device-mount event based on a change in ambient light detected by an ambient light sensor of the content-playback device and at least one of motion or orientation measurements from the content-playback device; initiate a content-playback session based on the playback-initiation action; identify a content-playback position based on the playback-initiation action; and playback a replay of a portion of the content playing on the external display device within the content-playback session on the content-playback device based on the identified content-playback position, wherein the content playing on the external display device is unaffected by playback of the replay on the content-playback device.

8. The computing device of claim 7, wherein the instructions that cause the computing device to identify content based on the environment in which the content-playback device is located cause the computing device to identify content playing on an external display device that is separate from the content-playback device.

9. The computing device of claim 7, wherein the instructions that cause the computing device to playback content include instructions that cause the computing device to playback a content stream associated with the identified content.

10. The computing device of claim 7, wherein the instructions that cause the computing device to detect the playback-initiation action include instructions that cause the computing device to detect a device-mount event.

11. The computing device of claim 10, wherein the device-mount event is detected based on orientation of the content-playback device.

12. The computing device of claim 10, wherein the device-mount event is detected based on ambient light sensed by the content-playback device.

13. A method, comprising: identifying, by a head-mounted display device, a content stream associated with external content playing on an external display device; detecting, by the head-mounted display device, that the head-mounted display device has been mounted on a user's head based on a change in ambient light detected by an ambient light sensor of the head-mounted display device and at least one of motion or orientation measurements from the head-mounted display device; responsive to detecting that the head-mounted display device has been mounted on the user's head: identifying, by the head-mounted display device, a synchronization position in the content stream that corresponds to the external content; identifying a replay-playback position within the content stream that precedes the synchronization position; and triggering playback of the content stream based on the identified replay-playback position, wherein the external content playing on the external display device is unaffected by playback of the content stream.

14. The method of claim 13, further comprising:
receiving a user input; and
in response to the user input, triggering playback of the content stream in slow motion.

15. The method of claim 14, wherein the user input is received by detecting that a button of the head-mounted display device is depressed for at least a predetermined duration of time.

16. The method of claim 13, wherein the content stream includes a replay content stream that is different than a video stream of the external content.

17. The method of claim 16, wherein the replay content stream includes video captured by a different camera than the video stream of the external content.

18. The method of claim 13, wherein the content stream is identified by:
recording an audio sample of the external content playing on the external display device using a microphone of the head-mounted display device;
generating an acoustic fingerprint based on the audio sample;
using the acoustic fingerprint to identify the external content playing on the external display device; and
identifying the content stream based on the identified external content.

19. The method of claim 13, further comprising:
identifying a plurality of content streams associated with the external content, each of the content streams being associated with different cameras; and
presenting a content selection user interface for receiving a selection input to identify a content stream from the plurality of content streams;
responsive to receiving the selection input, identifying a content stream based on the selection input; and
playing the identified content stream.

20. The method of claim 19, wherein the content selection user interface includes a grid of cells, each of the cells being associated with a content stream from the plurality of content streams, and wherein the selection input includes centering a cell of the grid in a field of view of the head-mounted display device to select the content stream associated with the cell.

* * * * *